(No Model.)  6 Sheets—Sheet 1.

D. F. HARTFORD.
MACHINE FOR CUTTING SOLES OR LIKE FORMS.

No. 424,477. Patented Apr. 1, 1890.

Witnesses.
Lauritz N. Möller
J. R. Snow

Inventor.
David F. Hartford
by his attorney
J. E. Maynadier (No Model.) 6 Sheets—Sheet 2.

D. F. HARTFORD.
MACHINE FOR CUTTING SOLES OR LIKE FORMS.

No. 424,477. Patented Apr. 1, 1890.

Witnesses.
Lauritz H. Möller.
John R. Snow.

Inventor.
David F. Hartford
by his attorney
J. E. Maynadier (No Model.) 6 Sheets—Sheet 3.
D. F. HARTFORD.
MACHINE FOR CUTTING SOLES OR LIKE FORMS.
No. 424,477. Patented Apr. 1, 1890.
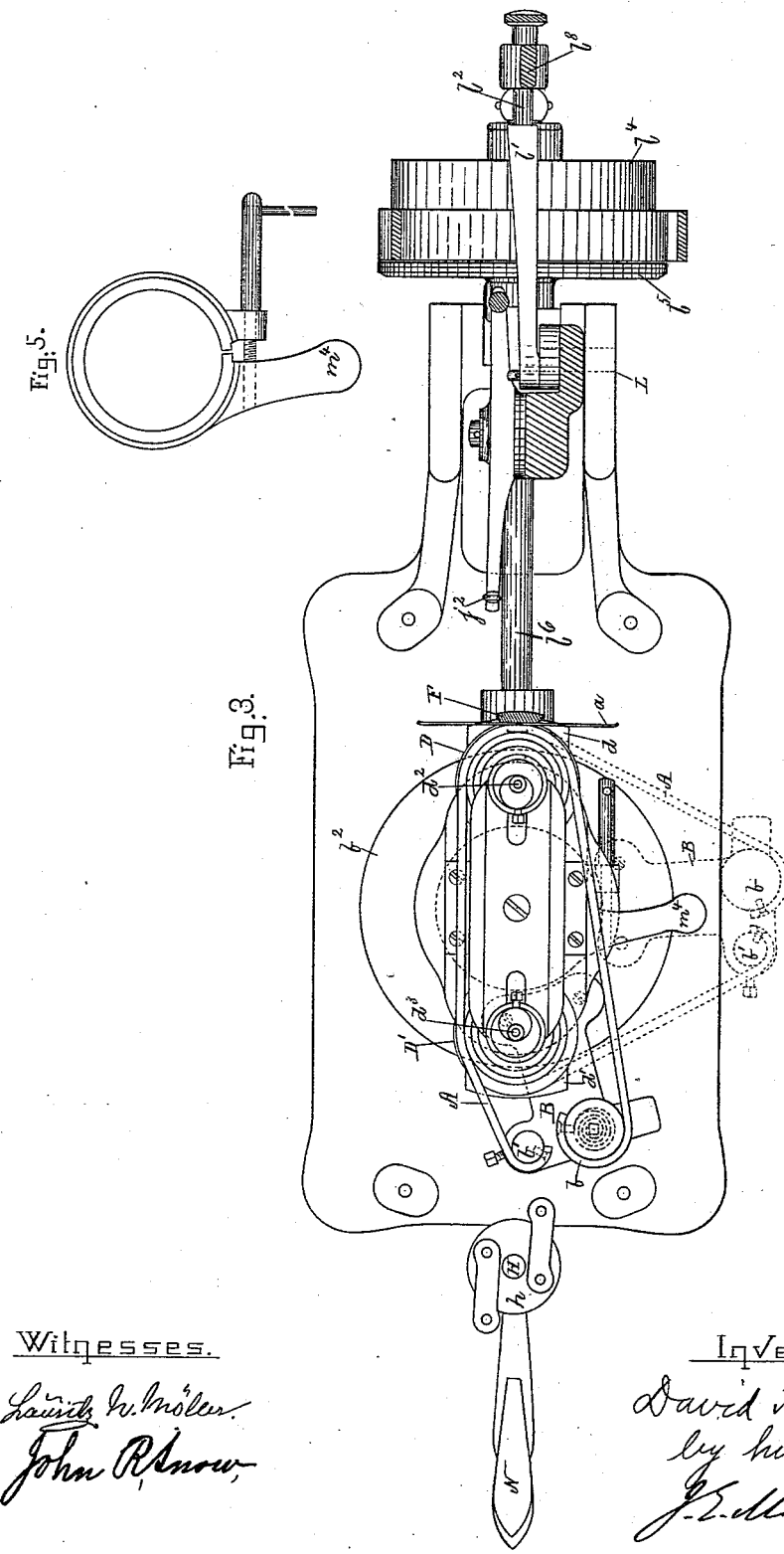
Witnesses.
Lauritz M. Möller
John R. Snow
Inventor.
David F. Hartford
by his attorney (No Model.) 6 Sheets—Sheet 4.

D. F. HARTFORD.
MACHINE FOR CUTTING SOLES OR LIKE FORMS.

No. 424,477. Patented Apr. 1, 1890.

Witnesses.
Lauritz N. Möller.
John R. Luna

Inventor.
Davis F. Hartford
by his attorney (No Model.) 6 Sheets—Sheet 5.
D. F. HARTFORD.
MACHINE FOR CUTTING SOLES OR LIKE FORMS.
No. 424,477. Patented Apr. 1, 1890.
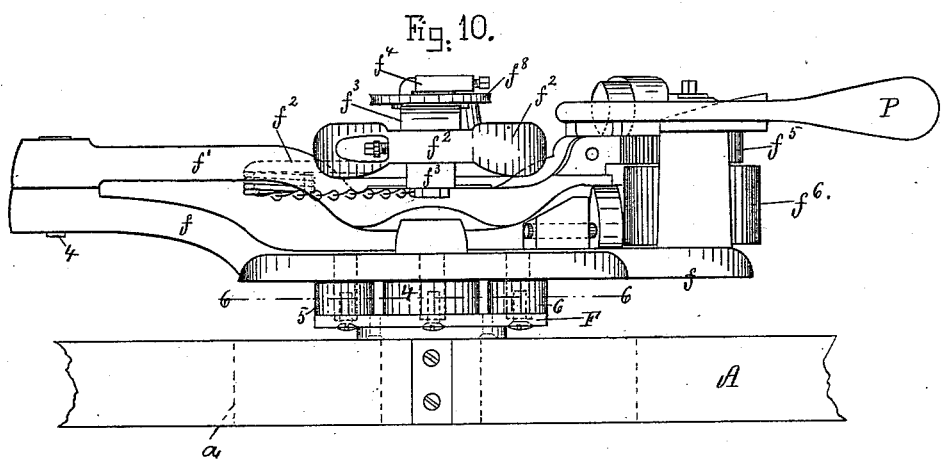
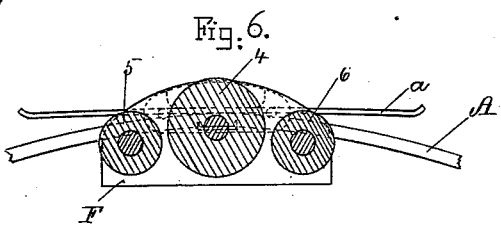
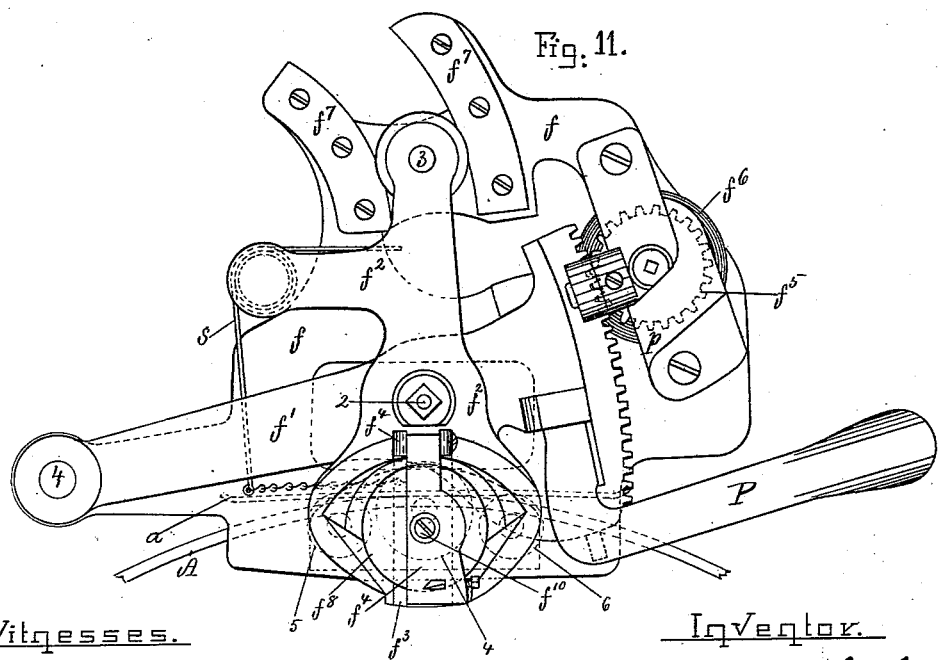
Witnesses. Inventor.

(No Model.)  6 Sheets—Sheet 6.
D. F. HARTFORD.
MACHINE FOR CUTTING SOLES OR LIKE FORMS.
No. 424,477.  Patented Apr. 1, 1890.
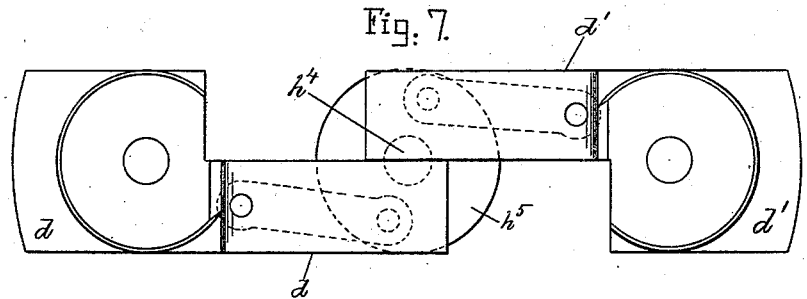
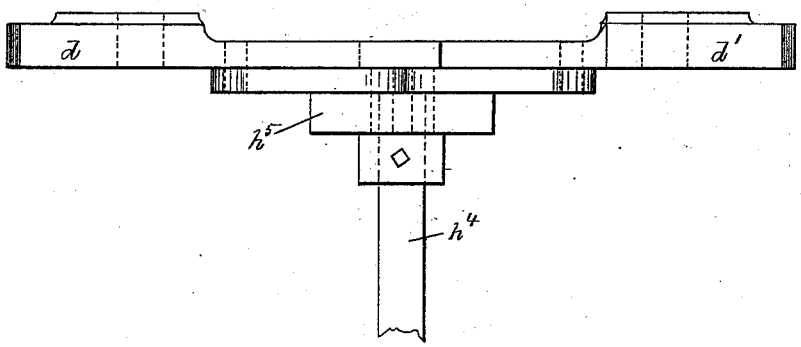
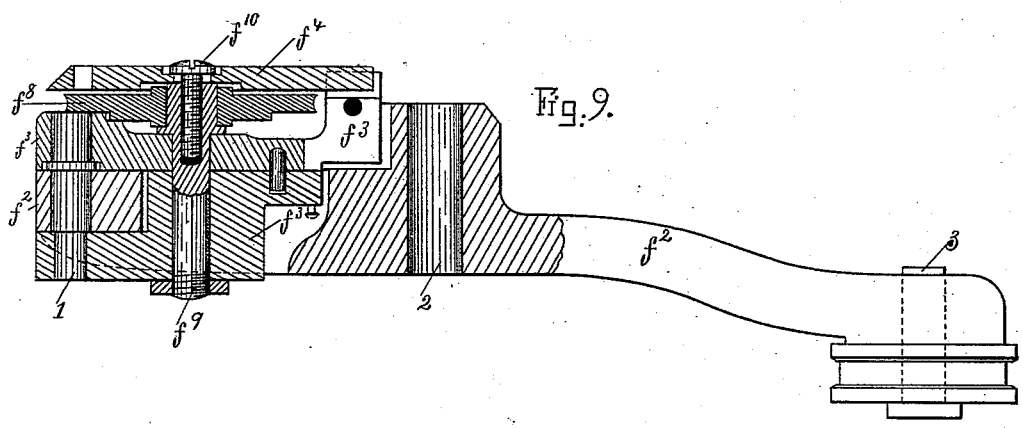
Witnesses.
Inventor.
David F. Hartford
by his attorney

UNITED STATES PATENT OFFICE.

DAVID F. HARTFORD, OF BOSTON, MASSACHUSETTS.

MACHINE FOR CUTTING SOLES OR LIKE FORMS.

SPECIFICATION forming part of Letters Patent No. 424,477, dated April 1, 1890.

Application filed January 3, 1889. Serial No. 295,462. (No model.)

*To all whom it may concern:*

Be it known that I, DAVID F. HARTFORD, of Boston, in the county of Suffolk and State of Massachusetts, have invented an Improved Machine for Cutting Soles or Like Forms, of which the following is a specification, reference being had to the accompanying drawings, in which—

Figure 1:
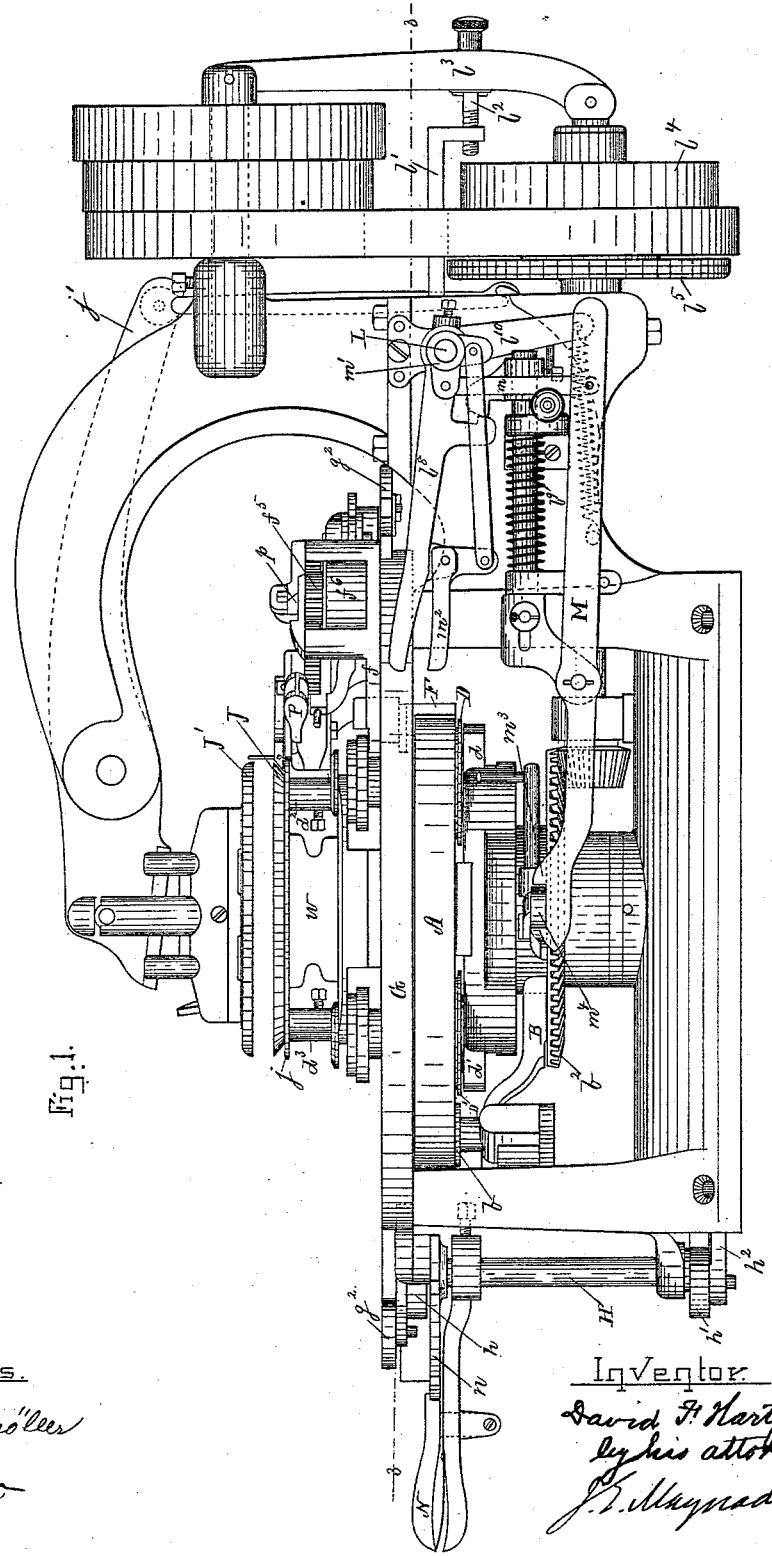
Figure 2:
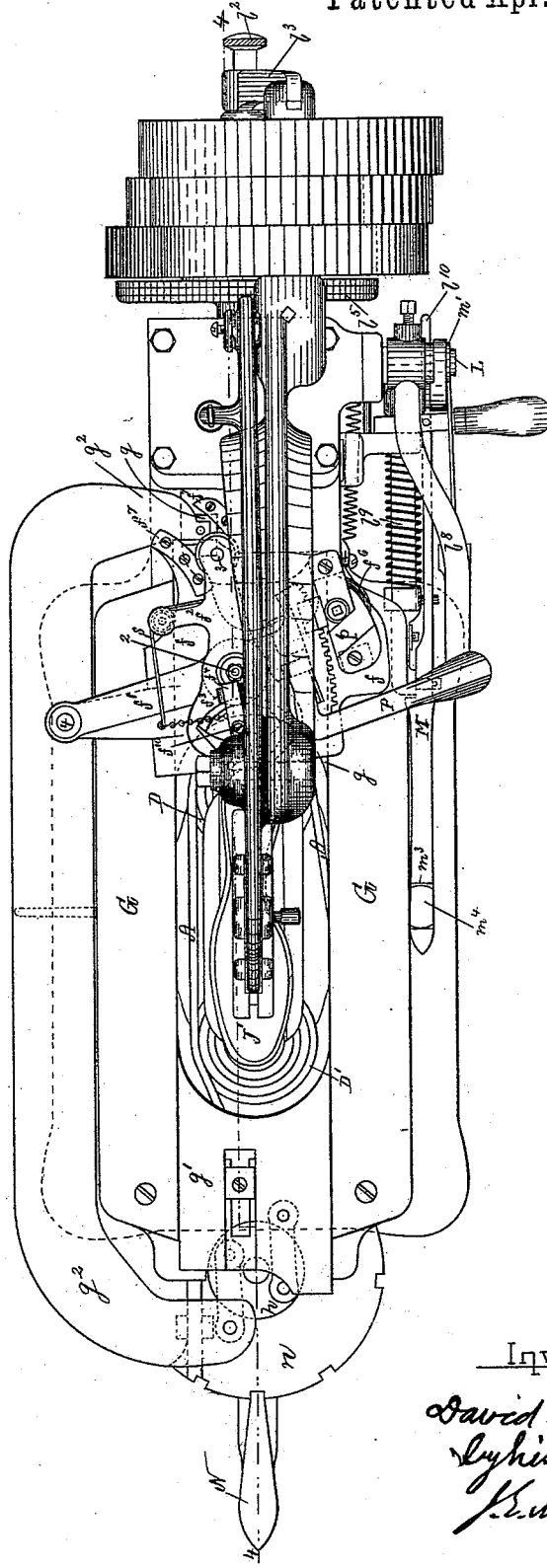
Figures 4, 19:
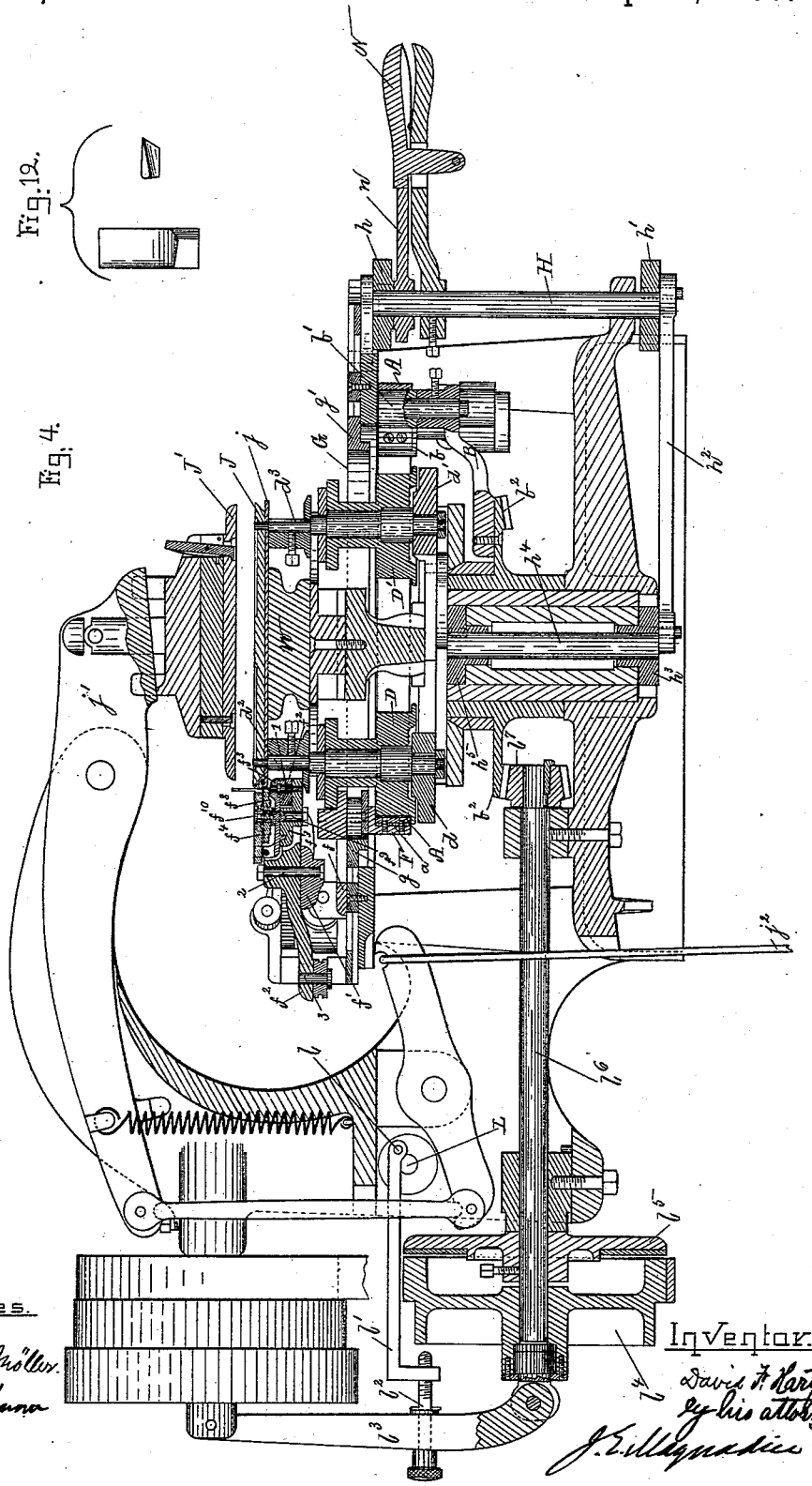

Figure 1 is a side elevation; Fig. 2, a plan; Fig. 3, a plan, partly in section, on line 3 3 of Fig. 1; Fig. 4, a vertical section on line 4 4 of Fig. 2. Figs. 5, 6, 7, 8, and 9 are details explained below. Fig. 10 is a side elevation, and Fig. 11 a plan, of a knife-carrier. Fig. 12 is a side elevation and plan of the knife.

In my Patent No. 309,850, dated December 30, 1884, I describe a machine by which a knife is carried about a pattern-plate, thereby shaping a blank of sheet material held between two clamps in accordance with the shape of the pattern-plate; and my present machine is an improvement upon machines of that class—that is, machines by which a strip of leather or other sheet material is brought to the shape desired by means of a knife which traverses about the clamps between which the blank or strip to be shaped is held, the main portion of the knife-carrier traveling about the clamps, while the path of the knife-edge is determined by the pattern-plates. Machines of this class are mainly employed in cutting shoe-soles from blanks or from strips of leather or other material used for shoe-soles, and I will describe my improved machine simply as a sole-cutting machine, it being understood of course that the pattern is what determines the final shape of the sheet material which remains between the clamps after the knife has passed about the clamps.

The main feature of my present invention consists in a new plan of moving the knife-carrier about the clamps by means of a flexible strap or chain or the like, the shank of the knife-carrier being fastened to it between its ends, and its ends being secured to a holder which travels about an axis, the flexible strap or chain being kept taut by two or more pulleys.

A is the flexible strap; $b\ b'$, studs projecting from the arm B, to which the ends of the strap A are secured; D D', the pulleys which distend the strap A, and F the shank of the knife-carrier secured in the strap A, as shown in cross-section in Fig. 4. I have shown the arm B fast to the gear $b^2$, and it will be clear that when that gear is revolved on its axis the strap A will travel about the pulleys D D' and carry with it the knife-carrier, whose shank F is fast to strap A, two positions of the strap A being shown in Fig. 3, one in full lines and the other in dotted lines, from which it will be clear that the knife-carrier will be caused to travel on the bed G about the clamps J J' whenever the gear-wheel $b^2$ is revolved.

The bed G has the usual opening through it, which opening is partially covered by the slides $g\ g'$, and the studs $d^2\ d^3$, upon which the pulleys D D' are mounted, are carried by slides $d\ d'$. These slides $g\ g'$ and $d\ d'$ are for the purpose of adjusting the machine for different lengths of shoe-soles, and these slides are adjusted by the rock-shaft H, which carries the crank-disks $h\ h'$. The crank-disk $h$ is linked to the slide $g'$ and also linked to the connector $g^2$, which is connected to the slide $g$, so that a motion of rock-shaft H on its axis in one direction will move the slides $g\ g'$ nearer together in their ways in the bed G, and vice versa. The crank-pin on disk $h'$ is connected by link $h^2$ to a crank-pin on the hub $h^3$, which hub is fast to rock-shaft $h^4$, and hub $h^5$, which is also fast to shaft $h^4$, carries two crank-pins, one of which is linked to slide $d$ and the other to slide $d'$, as clearly shown in Figs. 7 and 8, Fig. 7 being a plan and Fig. 8 an elevation of these parts detached; hence the motion of rock-shaft H not only adjusts the upper slides $g\ g'$, but also the lower slides $d\ d'$, as well as the studs $d^2\ d^3$ and the pulleys D D', carried by the lower slides. This is also a feature of my invention, and is of great practical importance, for it enables the machine to be adjusted for different lengths with great facility and accuracy.

It will be clear that the strap A must vary in length to suit the adjustments of pulleys D D', and to admit of that variation the stud $b$, to which one end of the strap is attached, is connected to arm B by means of a stout clock-spring, which admits of the stud $b$ turning on its axis, and thereby always holding strap A taut whatever be the distance apart of the pulleys D D' and whatever be the position of arm B with relation to those pulleys. By thus mounting one end of the belt A on a spring I am enabled to use a belt or strap of leather or other non-extensible material, for, as will be clear, if both ends of the strap A were secured to stud $b'$ a portion of the strap A must be made of material which is extensible and resilient.

The lower clamp J and the pattern $j$ are mounted upon the upper ends of the studs $d^2$ $d^3$, (see Fig. 4,) and the upper clamp J' is carried by lever $j'$ and is depressed by treadle-rod $j^2$, or in any other suitable way, as will be clear without further description. The clamps J J' approximate only in size and shape to the pattern-plate $j$, and in practice several consecutive sizes of pattern-plates may be used with one size of clamp. The slides $g\ g'$ and $d\ d'$ are adjusted to suit different lengths of clamp J, and clamp J and pattern-plate $j$ are then put in place on studs $d^2\ d^3$ and block W. The corresponding clamp J' is then attached to lever $j'$, and the stock is clamped between the clamps J J'.

The machine is started by turning rock-shaft L, the crank-pin $l$ upon a disk fast to rock-shaft L being connected by link $l'$ and adjusting-screw $l^2$ to lever $l^3$, which lever forces pulley $l^4$ against the friction-disk $l^5$, which is fast to shaft $l^6$, which carries gear $l^7$, and the gear $l^7$ meshing with gear $b^2$. Rock-shaft L is turned in a direction to start the machine by a downward thrust upon arm $l^8$, and a hook on arm $l^8$ engages with the hook on rod $l^9$. This rod $l^9$ is pinned to arm M, and one end of arm M is connected by link $m$ to an arm from hub $m'$. Another arm from this hub is linked to the bell-crank $m^2$, which is fulcrumed to arm $l^8$, so that when the workman takes hold of arm $l^8$ he also grasps one arm of bell-crank $m^2$, and thereby turns hub $m'$ in a direction to lift the outer end of arm M and free the stop $m^3$ from stop $m^4$, which is fast to gear-wheel $b^2$. When the bell-crank $m^2$ is released, the hook portion of arm M, one jaw of which forms stop $m^3$, rises into the path of stop $m^4$, so that after a full revolution of gear $b^2$ the stop $m^4$, carried by gear $b^2$, strikes stop $m^3$ and forces arm M backward, and with it rod $l^9$, against the force of its spring, and this backward motion of rod $l^9$ frees its hook from the hook of arm $l^8$, whereupon arm $l^8$ and rock-shaft L are moved back to their first position by the spring which is fast to arm $l^{10}$, arm $l^{10}$ being itself fast to rock-shaft L, and this backward motion of rock-shaft L throws pulley $l^4$ away from friction-disk $l^5$, thus stopping the machine. After the machine is thus stopped the spring on the rod $l^9$ throws that rod back slightly, and stop $m^3$, acting through stop $m^4$, moves gear $b^2$ slightly backward, thus bringing the knife to its first position, although the knife traveled slightly past its first position before the machine was stopped.

The knife-carrier consists of the bed $f$, to which the shank F is rigidly attached, (preferably by the studs which pass through and serve as journals for the wheels 4 5 6,) the arm $f'$, journaled to bed $f$, (see Figs. 10 and 11,) the arm $f^2$, journaled to arm $f'$ and shown enlarged and partly in section in Fig. 9, the knife-block $f^3$, and the knife-holder $f^4$. The anti-friction rolls 4, 5, and 6 (illustrated in Figs. 6 and 10) project outward from the bed $f$ of the knife-carrier just above the top of the shank F and travel against the inner surfaces of the sides of the orifice through the bed G and the curved ends of the slides $g\ g'$ in the usual way with machines of this class. The knife-carrier bed $f$ slides upon the flat upper surface of the bed G and of the slides $g\ g'$ in the usual way. The arm $f'$ is pressed toward the pattern-plate by means of the rack on one end of arm $f'$ and the pinion $f^5$, which is fast to a shaft controlled by the clock-spring $f^6$. This is in order that the travel of arm $f'$ may not unduly increase or decrease the tension of the spring by which the arm $f'$ is pressed toward the pattern-plate. The arm $f^2$ is pinned to arm $f'$, as shown in Fig. 11, and this arm $f^2$ carries at one end the knife-block $f^3$, and at the other end it is guided by curved ways $f^7$, which are fast to the bed $f$. On reference to Figs. 9 and 11 it will be seen that the arm $f^2$ has an intermediate axis 2, by which it is held to arm $f'$, and that the knife-block $f^3$ is pivoted to it by the pin $l$. It is important that the cutting-edge of the knife should travel always in a single line, which is a radius from the axes of the studs $d^2\ d^3$ as the knife passes about the axes, and this is effected by means of the curved ways $f^7$ when the arm $f^2$ is carried by the arm $f'$, which moves about an axis 4. The knife-block $f^3$ (shown in section in Fig. 9) is best made in two parts, and is pinned to the arm $f^2$ by pin $l$, the two parts being clamped and doweled together, as indicated in Fig. 9. The guide-wheel $f^8$ is mounted upon the upper end of bolt $f^9$, which holds together the two parts $f^3$ of the knife-block, and the knife-holder $f^4$ is secured in jaws formed by slitting one end of the upper part of the knife-block $f^3$. The knife-holder $f^4$ also has a slot near its middle, through which passes screw $f^{10}$, as shown in Fig. 9. This is in order to enable knife-holder $f^4$ to be so adjusted as to bring the edge of the knife at a varying distance from the periphery of the guide-wheel $f^8$. Although the knife-edge should in theory be in a line coincident with the axis of the pin $l$, yet practically it may be moved slightly nearer to the axis of the bolt $f^9$, and it is often desirable to do this in order to make the article shaped slightly larger than the pattern-plate, and it is for this reason that the knife-holder $f^4$ is adjustable, as described. The main feature of this part of my invention consists in mounting the knife-block $f^3$ in the end of arm $f^2$, with guide-wheel $f^8$ between the block $f^3$ and holder $f^4$. This arrangement gives all the advantages of my former patent, and also allows the pattern-plate to be brought much closer to the stock to be shaped.

I have shown a plate $a$ between the shank F and the strap A. (See Figs. 4 and 6, Fig. 6 being a detailed sectional view on line 6 6 of Fig. 10.) This plate serves to prevent an unsteady motion of the knife-holder when the shank F is carried by the strap A past the pulleys D D′, for the plate $a$ stands at a tangent to the surface of the strap A when bent around the pulleys, and then comes in flat contact with the surface of the strap A in such a way as to steady the motion of the knife-carrier.

The operation is as follows: The machine is adjusted for the desired length of the clamps J J′ and pattern-plate $j$ by releasing the catch N from notched plate $n$ and turning shaft H until the catch N is brought into the proper notch of plate $n$, and thereby adjusting slides $g$ $g'$ and $d$ $d'$ so that the clamps and pattern-plate will fit upon the studs $d^2$ $d^3$ of the pulleys D D′, as before described. This also adjusts the opening through bed G, the inner walls of which are formed by the inwardly-curved ends of the slides $g$ $g'$ and by the side walls of the orifice through the bed G. The strap A is at the same time adjusted by its spring-stud $b$, and the strip or blank is then clamped between the clamps J J′, and the handle P of the knife-carrier is released from the holding-notch $p$, (see Fig. 11,) thereby allowing spring $f^6$ to turn pinion $f^5$ and throw forward the arm $f'$ until the guide-wheel $f^8$ is brought against the edge of the pattern-plate $j$. The operator then grasps the bell-crank $m^2$, and thereby lifts the outer end of rod M, lowering the other end of that rod and carrying stop $m^3$ out of the path of stop $m^4$. (This stop and its split ring and tightening-screw, by which it is held to the hub or gear $b^2$, is shown detached in Fig. 5.) He then depresses arm $l^8$, thereby turning rock-shaft L, and starts the machine, as before described, causing gear $b^2$ to make one revolution, and thereby carry the strap A about the pulleys D D′, and with it the knife-carrier and its knife about the pattern-plate $j$, the knife cutting away the surplus portions of the stock and leaving the shaped article clamped between the clamps J J′. When the gear $b^2$ is about completing its revolution, the stop $m^4$ carried by it strikes stop $m^3$, and thereby releases arm $l^8$ and allows the spring connected to arm $l^{10}$ to throw rock-shaft L back and stop the machine. The clamps J J′ are then released and the shaped sole taken out, and the operation is repeated upon another blank or strip. As the knife traverses about the article to be shaped, the knife-block swings slightly upon the pin $l$, and were it not restrained the knife would sometimes fail to cut exactly according to pattern. It is desirable, therefore, to give the knife-block a slight tension in one direction, and this is accomplished by the spring $s$, (see Fig. 11,) which is connected to arm $f^2$, and also to the knife-block. This spring aids in keeping the knife-blade practically in line with the cut, and also insures the knife cutting in exact accord with the pattern-plate.

In Fig. 11 the knife-holder and knife-block are shown in their midway position; but when not in use the rear end of the knife-holder $f^4$ will be pulled to the left of its position in Fig. 11 by spring $s$, and when in use the knife-holder $f^4$ and the knife-block $f^3$ are in almost constant motion on its pin $l$.

What I claim as my invention is—

1. In a machine for cutting soles and other forms, the combination of the shank F of the knife-carrier, flexible strap A, pulleys D D′, and a knife-holder $f^4$, which rotates about an axis, the ends of the strap being secured to the holder, all substantially as and for the purpose set forth.

2. In a machine for cutting soles and other forms, the combination of the bed G, slides $g$ $g'$, studs $d^2$ $d^3$, and slides $d$ $d'$, with mechanism, substantially such as described, for simultaneously adjusting both pairs of slides, all substantially as set forth.

3. In a machine for cutting soles and other forms, the combination of knife-holder $f^4$, block $f^3$, and arm $f^2$ with arm $f'$ and ways $f^7$, all substantially as and for the purpose specified.

4. In a machine for cutting soles and other forms, the combination of the knife-holder $f^4$, guide-wheel $f^8$, block $f^3$, and arm $f^2$, the block $f^3$ being pinned by pin $l$ to arm $f^2$, and the guide-wheel $f^8$ being between the knife-holder $f^4$ and block $f^3$, all substantially as described.

5. In a machine for cutting soles and other forms, the combination of the rock-shaft L, crank-pin $l$, connections $l'$ $l^2$, lever $l^3$, pulley $l^4$, and friction-disk $l^5$, all substantially as described.

6. In a machine for cutting soles and other forms, the combination of the stops $m^3$ $m^4$, arm M, and rod $l^9$, and rock-shaft L, with arms $l^8$ $l^{10}$, the rock-shaft controlling the friction-clutch, all substantially as described.

DAVID F. HARTFORD.

Witnesses:
EDWARD S. BEACH,
JOHN R. SNOW.